(12) United States Patent
Taguchi et al.

(10) Patent No.: US 6,965,305 B2
(45) Date of Patent: Nov. 15, 2005

(54) SENSOR ID REGISTRATION METHOD FOR TIRE AIR PRESSURE MONITORING APPARATUS

(75) Inventors: Akihiro Taguchi, Oobu (JP); Ryozo Okumura, Kariya (JP)

(73) Assignee: Denso Corporation, Kariya (JP)

( * ) Notice: Subject to any disclaimer, the term of this patent is extended or adjusted under 35 U.S.C. 154(b) by 154 days.

(21) Appl. No.: 10/670,509

(22) Filed: Sep. 26, 2003

(65) Prior Publication Data

US 2004/0061602 A1    Apr. 1, 2004

(30) Foreign Application Priority Data

Sep. 27, 2002    (JP)    .............................. 2002-283134

(51) Int. Cl.[7] .............................................. B60C 23/00
(52) U.S. Cl. ...................... 340/447; 340/442; 340/445; 73/146.5
(58) Field of Search ................................. 340/442, 443, 340/444, 445, 446, 447, 870.16, 448, 870.11; 73/146, 146.2, 146.3, 146.4, 146.5, 146.8; 116/34 R, 34 B, 34 A; 152/152.1

(56) References Cited

U.S. PATENT DOCUMENTS

| | | | |
|---|---|---|---|
| 5,602,524 A | | 2/1997 | Mock et al. |
| 5,612,671 A | * | 3/1997 | Mendez et al. ............. 340/447 |
| 5,838,229 A | * | 11/1998 | Robinson, III ............. 340/442 |
| 6,441,728 B1 | * | 8/2002 | Dixit et al. ................. 340/447 |
| 6,804,999 B2 | * | 10/2004 | Okubo ........................ 73/146 |
| 2002/0070876 A1 | | 6/2002 | Hirohama et al. |

FOREIGN PATENT DOCUMENTS

JP    3212311    7/2001

* cited by examiner

*Primary Examiner*—Anh V. La

(74) *Attorney, Agent, or Firm*—Posz Law Group, PLC

(57) ABSTRACT

The present invention relates to a sensor ID registration for a tire air pressure monitor including a sensor unit built in each of tires of a vehicle and a receiver mounted in a vehicle body for monitoring the in-tire air pressure. The registration is conducted through using a control unit and a registration unit, provided for each vehicle manufacturing line. A different control unit number is allocated to each of the control units and transmitted from the control unit to the receiver. Moreover, a specific number identical to the number is transmitted from the registration unit to the sensor unit and data including a sensor ID and the specific number is transmitted from the sensor unit. The receiver registers the sensor ID when the specific number and the control unit number agree with each other. This achieves accurate ID registration without registering an ID of another vehicle in error.

8 Claims, 4 Drawing Sheets

| SYNC | ID | PRESSURE | TEMPERATURE | FUNCTION | NUMBER | CRC |

SENSOR ID REGISTRATION METHOD FOR TIRE AIR PRESSURE MONITORING APPARATUS

BACKGROUND OF THE INVENTION

1) Field of the Invention

The present invention relates to a sensor ID registration method for a tire air pressure monitoring apparatus which measures an air pressure in the interior of each of tires of a vehicle through the use of a sensor built in the tire and transmits the measurement result by means of radio transmission for monitoring the in-tire air pressure.

2) Description of the Related Art

So far, such as disclosed in Japanese Patent No. 3212311, there has been known a tire air pressure monitoring device designed such that an air pressure in the interior of each of tires (in-tire air pressure) of a vehicle is measured through the use of a sensor built in the tire and is transmitted as data through radio transmission means to a receiver mounted on a vehicle body side so that the receiver identifies the sensor, which has transmitted the data, on the basis of a sensor identification signal (that is, sensor ID) included in the transmitted data for monitoring the in-tire air pressure.

In the case of this tire air pressure monitoring device, when a sensor ID (Identification) is registered in the receiver, the receiver is placed into a registration mode and data is transmitted from the sensor in this registration mode so that the sensor ID included in the transmitted data is stored and registered in a memory.

The sensor ID registration is made in a large number of manufacturing lines disposed in parallel with each other as shown in FIG. 6, or it is also be made with respect to a plurality of vehicles even in maintenance shops of dealers or the like.

Accordingly, in a case in which, when one vehicle is in a registration mode, data is transmitted thereto from a sensor of another vehicle, the sensor ID of the another vehicle can be registered in the memory of the one vehicle.

SUMMARY OF THE INVENTION

The present invention has been developed with a view to eliminating this problem, and it is therefore an object of the invention to accurately register a sensor ID in a tire air pressure monitoring apparatus.

For this purpose, in accordance with an aspect of the present invention, there is provided a sensor ID registration method for a tire air pressure monitoring apparatus, comprising the steps of transmitting a specific number allocated to a control unit (500), which makes communication with a receiver (100), from the control unit (500) to the receiver (100), transmitting a specific number identical to the specific number from a sensor ID registration communication unit (600) to a sensor unit (200), making the sensor unit (200) transmit data including a sensor ID and the specific number, and making the receiver (100) decide whether or not the specific number transmitted from the control unit (500) agrees with the specific number included in the data transmitted from the sensor unit (200) so that, when they agree with each other, said receiver (100) registers the sensor ID included in the transmitted data.

Thus, since the sensor ID included in the transmitted data is registered in a case in which the specific number transmitted from the control unit (500) agrees with the specific number included in the data transmitted from the sensor unit (200), it is possible to accurately register the sensor ID without registering an ID of a sensor mounted in another vehicle in error.

In this case, the specific number can be set in a pressure data area of the transmitted data, or it can also be set in a number area for specific numbers. The former does not require that a data area for the transmission of the specific number is newly provided in the transmitted data.

In addition, in a case in which the sensor ID registration is made in a large number of manufacturing lines disposed in parallel with each other, the control unit (500) and the sensor ID registration communication unit (600) are placed for each manufacturing line and a number set for each manufacturing line is used as the specific number.

The reference numerals in parentheses attached to the respective means or components signify the corresponding relation with respect to the concrete means in an embodiment which will be described later.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Embodiments of the present invention will be described hereinbelow with reference to the drawings.

(First Embodiment)

Figure 1:
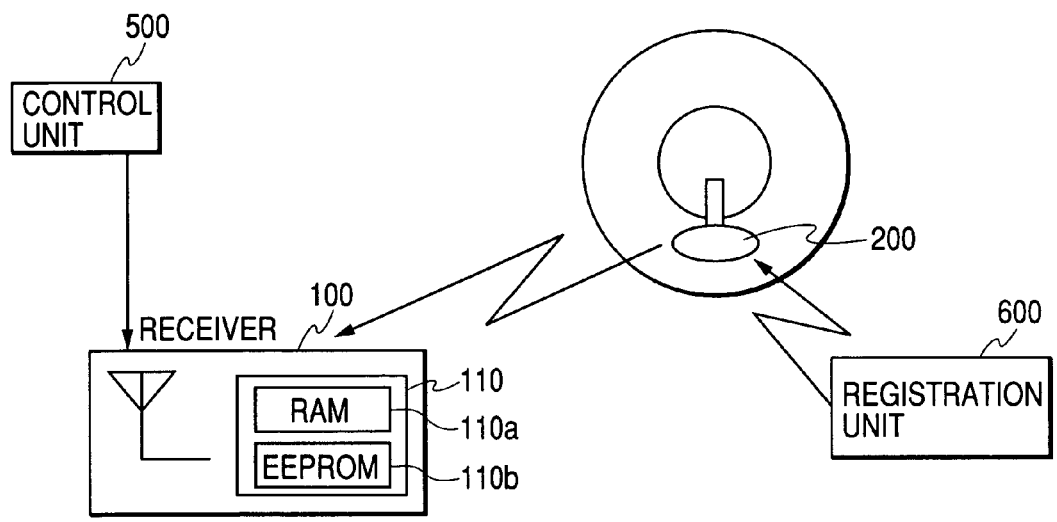
FIG. 1 is an illustration of a system configuration for sensor ID registration in a tire air pressure monitoring apparatus according a first embodiment of the present invention.

FIG. 1 is an illustration of a system configuration for sensor ID registration in a tire air pressure monitoring apparatus according a first embodiment of the present invention.

The tire air pressure monitoring apparatus is made up of a sensor unit 200 built in each of tires of a vehicle and a receiver 100 designed to receive data transmitted from each of the sensor units 200.

The sensor unit 200, although not shown in detail, has a configuration similar to a conventional one, that is, it is composed of a pressure sensor, a temperature sensor, a control circuit, a transmitting circuit and a battery. The pressure sensor measures an air pressure in the interior of a tire and the temperature sensor measures an air temperature in the interior of the tire. The control circuit produces transmission data (the detail of which will be mentioned later), shown in FIG. 2, on the basis of the measurement values from the pressure sensor and the temperature sensor. The transmitting circuit modulates the produced transmission data according to a predetermined modulation mode (ASK, FSK. or the like) and transmits it by means of radio transmission.

The receiver 100 is composed of a memory 110, a control circuit (not shown) and a receiving circuit (not shown). The memory 110 includes two types of a RAM 110a which is a volatile memory and an EEPROM 110b which is a non-volatile memory. In the receiver 100, sensor IDs peculiarly allocated to sensors are previously stored in the EEPROM 110b, and a decision on which of the sensors (tires) of the vehicle has transmitted the data to the receiver 100 can be made on the basis of the sensor IDs stored therein.

The aforesaid sensor ID registration for the tire air pressure monitoring apparatus is made through the use of a control unit 500 and a sensor ID registration communication unit (which hereinafter will be referred to simply as a "registration unit) 600 as shown in FIG. 1.

The control unit 500 is incorporated into a manufacturing apparatus installed in a manufacturing line, and is connected through a cable to the receiver 100 to transmit, to the receiver 100, a control unit number which is a specific number allocated to each manufacturing line through command inputting to be made by a keyboard (not shown).

The registration unit 600 is equipped with a transmitting unit (not shown), and this transmitting unit is brought close to a specified sensor 200 to make a radio communication with only the specified sensor unit 200. In this connection, since the electric wave attenuates in inverse proportion to the square of distance, if the radio transmission power is set at a low value when outputted from the transmitting unit of the registration unit 600 and the transmitting unit is brought close to the specified sensor unit 200, the communication can be made with respect to only the specified sensor unit 200, that is, sensor units 200 separated from the transmitting unit cannot receive the electric wave therefrom.

At this time, the transmission of a control unit number depending on the command input using a keyboard (not shown) and an instruction about transmission/non-transmission of data from the sensor unit 200 to the receiver 100 take place from the registration unit 600 to the sensor unit 200.

Figure 2:
FIG. 2 is an illustration of a structure of data to be transmitted from a sensor unit of the tire air pressure monitoring apparatus according the first embodiment.

FIG. 2 shows a structure of data to be transmitted from the sensor unit 200. As shown in FIG. 2, the transmission data comprises a synchronous pattern section, a sensor ID section, a pressure section serving as a pressure data area, a temperature section, a function section and a CRC section.

The synchronous pattern is a specified pattern for establishing synchronization, and the receiver 100 establishes the synchronization on the basis of this synchronous pattern.

To the pressure section, a 7-bit data area on an in-tire air pressure is allocated, and the measurement value on the in-tire air pressure is coded as an absolute value in units of 5 kPa from 0 Pa to 635 kPa and is set in this pressure section. That is, in a case in which the in-tire air pressure is 0 Pa, 5 kPa, 10 kPa, . . . , or 635 kPa, the value of 00h, 01h, 02h, . . . , or 7Fh (h represents hexadecimal number) is set in the pressure section of each transmission data structure. Incidentally, the atmospheric pressure is approximately 100 kPa, while a general in-tire air pressure is approximately 280 kPa to 330 kPa.

In addition, a measurement value on an in-tire air pressure is set in the temperature section.

Still additionally, for example, a bit indicative of the abnormality on air pressure, air temperature, pressure sensor, temperature sensor or the like, outputted from the control circuit of the sensor unit 200, is placed in the function section. That is, this enables the transmission of information other than the measurement values on the in-tire air pressure and the in-tire air temperature.

Yet additionally, an overhead bit according to the CRC (Cyclic Redundancy Check) error detection mode is set in the CRC section. Through the use of a generating function, the CRC operation is conducted with respect to the synchronous pattern section, the sensor ID section, the pressure section, the temperature section and the function section of the transmission data, and an overhead bit obtained by the CRC operation result is set in the CRC section.

Figure 3:
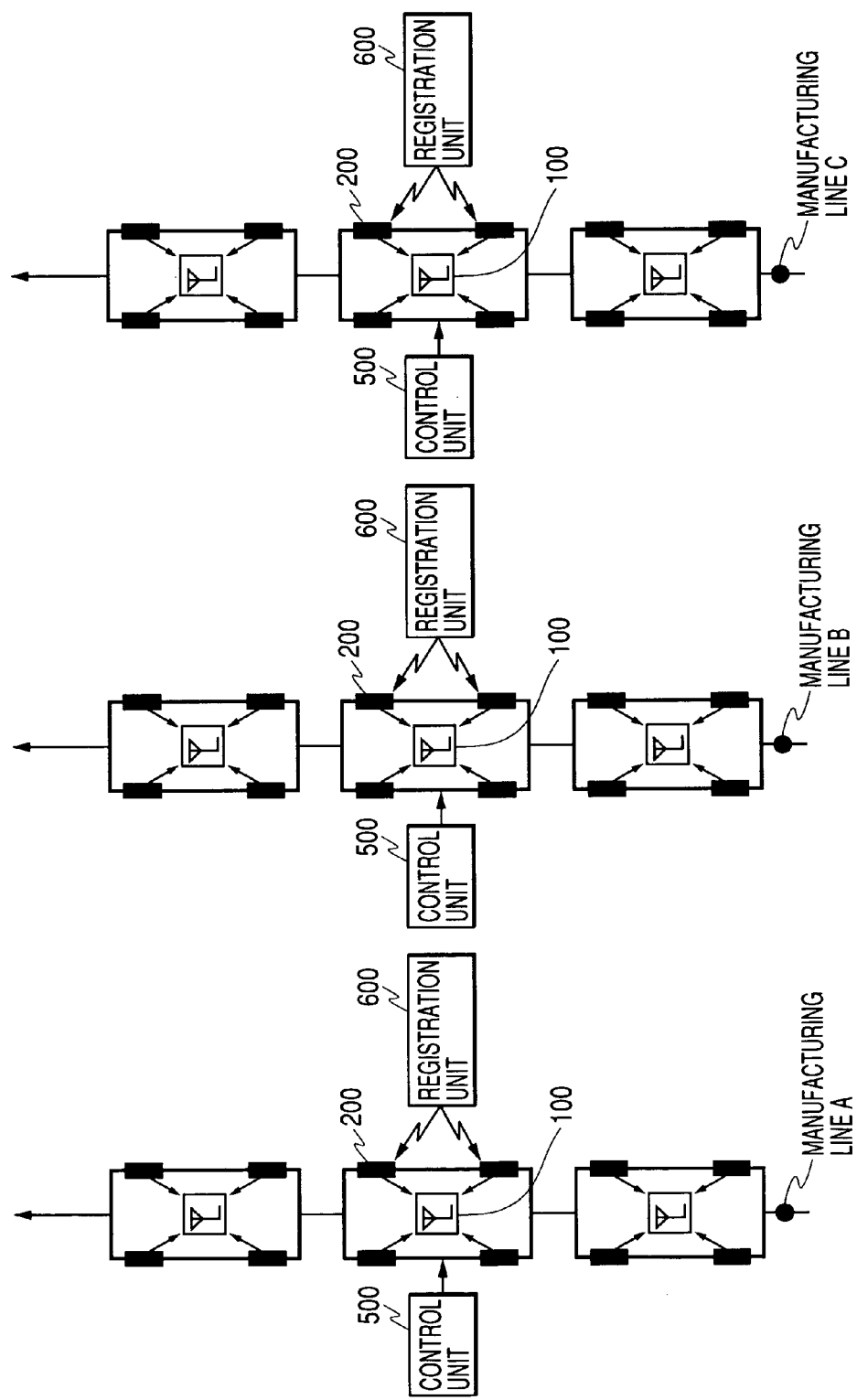
FIG. 3 is an illustration of sensor ID registration to be made in a tire air pressure monitoring apparatus in a plurality of manufacturing lines.

FIG. 3 shows a state of sensor ID registration for a tire air pressure monitoring apparatus in a plurality of manufacturing lines (manufacturing lines A to C) close to each other. As shown in FIG. 3, a manufacturing line A, a manufacturing line B and a manufacturing line C are disposed in parallel with each other, and the control unit 500 and the registration unit 600 are provided in each of the manufacturing lines A to C. Moreover, the sensor unit 200 is built in each of the tires of a vehicle in each of the manufacturing lines A to C.

Figure 4:
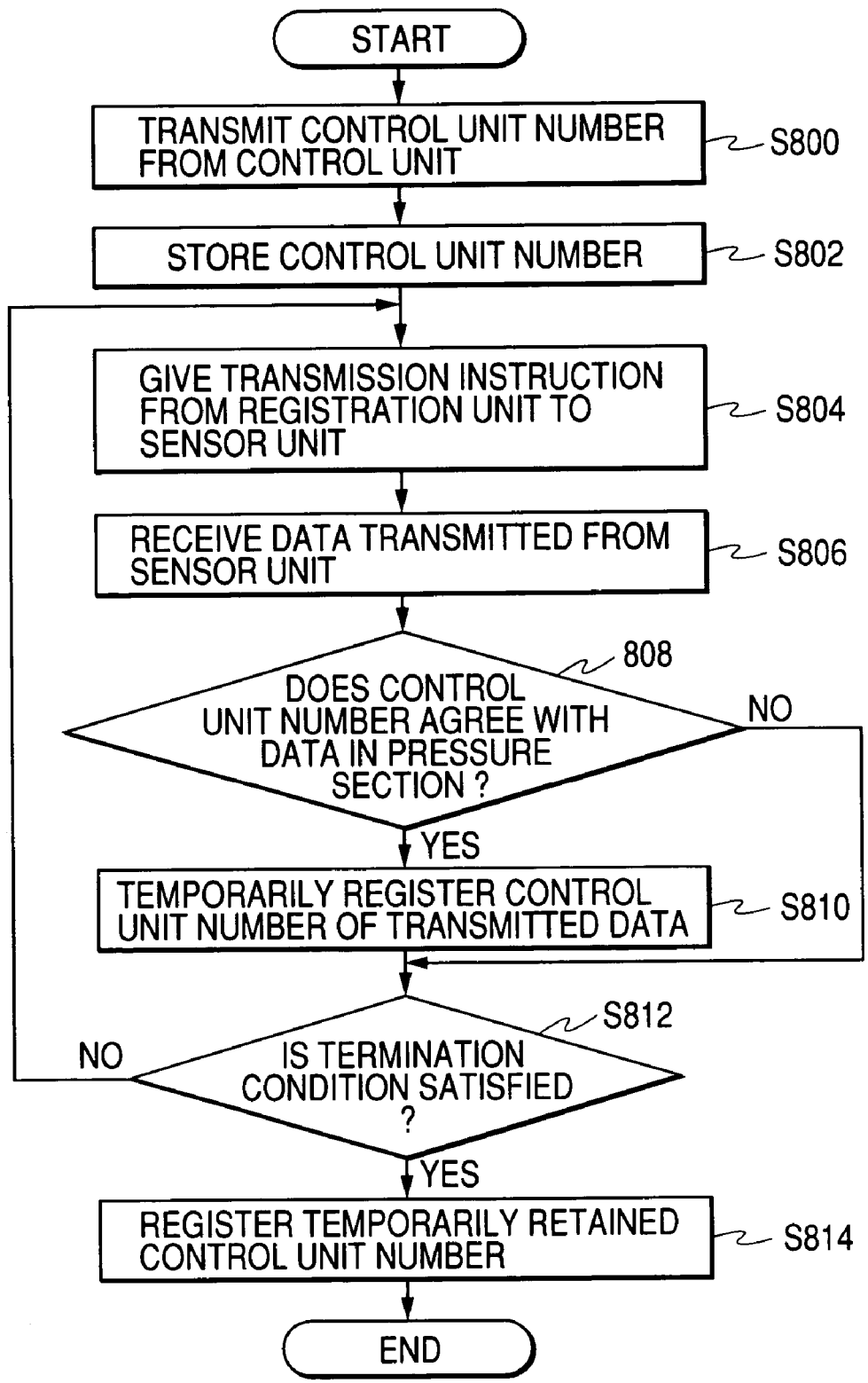
FIG. 4 is a flow chart showing a procedure for sensor ID registration in the tire air pressure monitoring apparatus according to the first embodiment.

FIG. 4 is an illustration of a procedure for the sensor ID registration in a tire air pressure monitoring apparatus. The sensor ID registration in the tire air pressure monitoring apparatus is made in the state shown in FIG. 3 and through the processing shown in FIG. 4.

Prior to the sensor ID registration procedure, an operator previously allocates a different control unit number for each of the manufacturing lines A to C to each of the control units 500 of each of the manufacturing lines A to C. As will be mentioned later, in this embodiment, since the control unit number is to be set in the pressure section of the transmission data shown in FIG. 2, in order to avoid failing to distinguish from the in-tire air pressure, a value the in-tire air pressure does not usually take is allocated thereto. That is, although the in-tire air pressure takes a value approximately equal to that at a flat tire, it is usually higher than the atmospheric pressure and, hence, a pressure value lower than the atmospheric pressure value is set as the control unit number. Concretely, the atmospheric pressure is approximately 100 kPa, and if the atmospheric pressure is set at 100 kPa and is coded in units of 5 kPa, the atmospheric pressure is converted into 14h (which corresponds to 20 in decimal) and, hence, 01h, 02h and 03h, which are below 14h, are allocated as the control unit numbers of the manufacturing lines A, B and C, respectively.

In addition, for the implementation of the sensor ID registration, the operator first conducts the command input through the use of a keyboard of each of the control units 500 and makes the control unit 500 transmit a control unit number and the number of sensors to be registered to the receiver 100 (S800). In this case, since the sensor ID registration is made with respect to sensor units 200 mounted in four tires of a vehicle, the number of sensors to be registered becomes four for each vehicle.

The receiver 100 stores the control unit number and the number of sensors to be registered, transmitted from the control unit 500, in the RAM 110a (S802).

Incidentally, the registration of the number of sensors is conducted in consideration of a spare tire or the fact that there are vehicles, such as trucks, having a so-called double tire construction. That is, the number of tires to be mounted varies according to vehicle, which requires the registration of the number of sensors.

Following this, the operator inputs a command through the use of the keyboard of the registration unit 600 to send a transmission instruction to one sensor unit 200 of a vehicle so that the sensor unit 200 transmits the transmission data in a state where a number identical to the control unit number of the control unit 500 is set in the pressure section of the transmission data (S804).

Then, the sensor unit 200, which has received the transmission instruction from the registration unit 600, transmits the transmission data in which the sensor ID is written in the sensor ID section and the number identical to the control unit number of the control unit 500 is set in the pressure section (S806).

The receiver 100 receives the data transmitted from the sensor unit 200 to make a decision as to whether or not the data in the pressure section of this transmitted data is identical to the control unit number stored in the RAM 110a in the step S802 (S808).

In a case in which the data in the pressure section of the transmitted data is identical to the control unit number stored in the RAM 110a, it signifies that the transmitted data is from the sensor of the vehicle located in the same manufacturing line, and the sensor ID included in the transmitted data is temporarily registered in the RAM 110a (S810). At this stage, the sensor IDs of the sensor units 200 are temporarily stored in the receiver 100. Subsequently, the operational flow advances to a step S812.

On the other hand, in a case in which the data in the pressure section of the transmitted data is different from the control unit number stored in the RAM 110a, it signifies that the transmitted data is from a sensor other than a vehicle disposed in the same manufacturing line, for example, data transmitted from a sensor of another vehicle. Accordingly, the operational flow goes to the step S812 without implementing the temporary registration of the sensor ID.

In addition, the receiver 100 makes a decision as to whether or not to satisfy a termination condition, that is, whether or not the number of sensors to be registered stored in the RAM 110a in the step S802 agrees (coincides) with the number of sensor IDs temporarily stored in the RAM 110a in the step S810 (S812).

If the termination condition is not satisfied, the processing in the steps S804 to S812 are successively implemented with respect to the remaining sensor units 200 which are not temporarily registered yet.

In the step S812, if the number of sensors registered reaches four to satisfy the termination condition, the receiver 100 stores the sensor IDs, temporarily stored in the RAM 110a in the step S810, in the EEPROM 110b (S814) and the sensor ID registration comes to completion.

As shown in FIG. 3, each of the vehicles in each of the manufacturing lines A to C is moved in a direction indicated by an arrow when the manufacturing process including the vehicle sensor ID registration come to completion, and each of the next vehicles is placed between the control unit 500 and the registration unit 600.

Thereafter, the sensor ID registration is made with respect to the next vehicle according to the procedure for the sensor ID registration shown in FIG. 4.

As described above, according to this embodiment, a different control unit number is allocated to each of the control units 500 and, in the step S808, a decision is made as to whether or not the control unit number transmitted from the control unit 500 in the step S800 agrees with the control unit number included in the data transmitted from the sensor unit 200 in the step S806, and if they agree with each other, the sensor ID included in the transmitted data is registered. Therefore, even if the sensor IDs of a plurality of tire air pressure monitoring apparatus are simultaneously registered at places close to each other, the accurate registration thereof is feasible.

In addition, in this embodiment, since a value the in-tire air pressure does not usually take is set as a control unit number in the pressure section of the data to be transmitted from the sensor unit 200, there is no need to add a bit for transmitting the control unit number to the data to be transmitted, thus preventing the lowering of the transmission efficiency.

When the sensor ID registration is conducted in this way, while a vehicle is running normally, on the basis of whether or not the sensor ID registered in the EEPROM 110b agrees with the sensor ID of the transmitted data from the sensor unit 200, the receiver 100 makes a discrimination between the data transmitted from the sensor unit 200 mounted in the tire of his/her own vehicle and the data transmitted from the sensor unit 200 mounted in the tire of another vehicle and monitors an air pressure and an air temperature in the tire. In this case, the receiver 100 collects the in-tire air pressure and the in-tire air temperature from the data in the pressure section of the transmitted data and the data in the temperature section thereof to make a decision on the abnormality of the in-tire air pressure and the abnormality of the in-tire air temperature according to a predetermined decision condition. Moreover, in consideration of the pressure sensor abnormality, the temperature sensor abnormality and others, alarm processing is conducted according to the specification of the apparatus to light an alarm lamp mounted on an instrument panel in the interior of the vehicle or produce a sound from a speaker of an audio device in the vehicle interior for notifying the occurrence of abnormality to a passenger.

In this connection, it is also appropriate that the receiver 100 conducts the alarm processing on the basis of a decision result on the in-tire air pressure and the in-tire air temperature in the sensor unit 200, that is, on the basis of, for example, a bit indicative of the pressure sensor abnormality and the temperature sensor abnormality in the function section of the transmitted data.

(Second Embodiment)

A description will be given hereinbelow of a second embodiment of the present invention. Although in the above-described first embodiment a value the in-tire air pressure does not take usually is set as a control unit number in the pressure section of transmission data, in the second embodiment a number section (number area) for setting a control unit number is provided in transmission data.

Figures 5, 6:
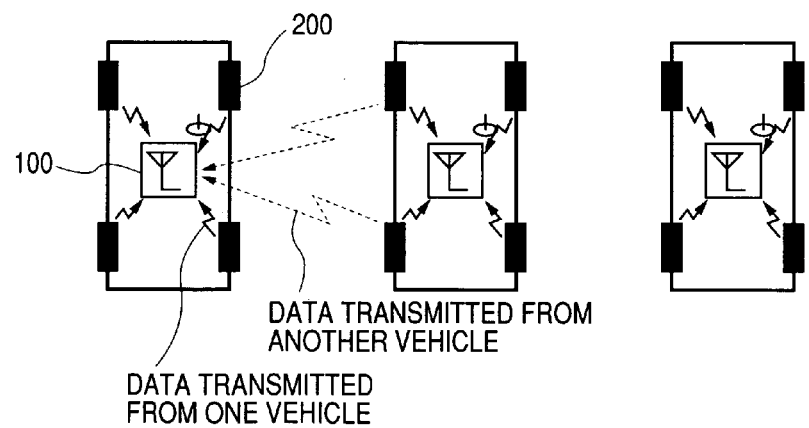
FIG. 5 is an illustration of a structure of data to be transmitted from a sensor unit according to a second embodiment of the present invention.
FIG. 6 is an illustration for explaining an object of the present invention.

FIG. 5 is an illustration of a structure of transmission data of the sensor unit 200 according to the second embodiment. As shown in FIG. 5, the transmission data comprises a synchronous pattern section, a sensor ID section, a pressure section, a temperature section, a function section, a number section and a CRC section. The synchronous pattern section, the sensor ID section, the pressure section, the temperature section, the function section and the CRC section in the transmission data are the same as those in the first embodiment. The number section is an area dedicated to setting a control unit number having a predetermined bit width, and the control unit number identical to that of the control unit 500 is set in this number section. The sensor ID registration is conducted using the control unit number set in this number section according to the procedure described in the first embodiment.

(Others)

Although in the above-described embodiments the sensor ID registration for a tire air pressure monitoring apparatus is conducted in a large number of manufacturing lines disposed in parallel with each other, the present invention is not limited to the manufacturing lines, but it is also applicable to a case in which the sensor ID registration is conducted for a plurality of vehicles at places close to each other in a maintenance shop of a dealer or the like. That is, the present invention is applicable to the sensor ID registration for a plurality of tire air pressure monitoring apparatus in places close to each other.

In addition, although in the above-described embodiments the registration unit 600 and the sensor units 200 are communicated with each other through wireless means, it is also possible that they are communicated through wire means.

Still additionally, although, in the processing for the sensor ID registration in an air pressure monitoring apparatus according to the first embodiment, the termination condition in the step S812 depends upon the number of sensor IDs temporarily registered in the RAM 110*a* in the step S810, it is also appropriate that, for example, the termination condition is established on the basis of time, for example, the time taken until the registration of all the sensor IDs reaches completion.

Moreover, although in the above-described embodiment the receiver 100 makes a discrimination between the data transmitted from the sensor unit 200 mounted in the tire of his/her own vehicle and the data transmitted from the sensor unit 200 mounted in the tire of another vehicle, it is also appropriate that, when the sensor ID is registered in the receiver 100, data are successively transmitted from the sensor units 200 and are stored in the EEPROM 110*b* in a state where the sensor ID included in the transmitted data and the tire of the vehicle are associated with each other to identify the position of the sensor unit 200 which is transmitting the data.

Still moreover, although in the above-described embodiments the radio transmission power is set at a low value when outputted from the transmitting unit of the registration unit 600 and the transmitting unit is brought close to the specified sensor unit 200 so that the communication is made with respect to only the specified sensor unit 200 and the sensor units 200 separated from the transmitting unit cannot receive the electric wave therefrom, it is also appropriate that the radio directivity is made narrow to prevent another sensor unit 200 from receiving the transmitted data.

It should be understood that the present invention is not limited to the above-described embodiment, and that it is intended to cover all changes and modifications of the embodiments of the invention herein which do not constitute departures from the spirit and scope of the invention.

What is claimed is:

1. A sensor ID registration method for a tire air pressure monitoring apparatus including:
   a sensor unit built in each of tires of a vehicle for measuring an air pressure in the interior of said tire to transmit data through radio communications; and
   a receiver mounted in a vehicle body for receiving said data transmitted from said sensor unit to identify said sensor unit on the basis of a sensor ID included in the transmitted data and to monitor said air pressure in the interior of said tire,
   said method comprising the steps of:
   transmitting a specific number allocated to a control unit, which makes communications with said receiver, from said control unit to said receiver;
   transmitting a specific number identical to said specific number of said control unit from a sensor ID registration communication unit to said sensor unit;
   transmitting said data including said sensor ID and said specific number from said sensor unit; and
   in said receiver, making a decision as to whether or not said specific number transmitted from said control unit agrees with said specific number included in said data transmitted from said sensor unit so that, when they agree with each other, said receiver registers said sensor ID included in the transmitted data.

2. The method according to claim 1, wherein said data has a pressure data area in which a value of said air pressure in the interior of said tire is set, and said data is transmitted in a state where said specific number is set in said pressure data area.

3. The method according to claim 1, wherein said data has a number area in which said specific number is set, and said data is transmitted in a state where said specific number is set in said number area.

4. The method according to claim 1, wherein said control unit and said sensor ID registration communication unit are placed for each manufacturing line and a number set for each manufacturing line is used as said specific number.

5. A sensor ID registration method for a tire air pressure monitoring apparatus including a sensor unit built in each of tires of a vehicle for measuring an air pressure in the interior of said tire to transmit data through radio communications and a receiver mounted in a vehicle body for receiving said data transmitted from said sensor unit to identify said sensor unit on the basis of a sensor ID included in the transmitted data and to monitor said air pressure in the interior of said tire,
   said method made to implement sensor ID registration through the use of a control unit and a sensor ID registration communication unit provided in each vehicle manufacturing line, and comprising:
   a step of transmitting a control unit number, uniquely allocated to said control unit, from said control unit to said receiver;
   a step of giving an instruction signal from said sensor ID registration communication unit to said sensor unit for transmitting a specific number, identical to said control unit number, to said receiver;
   a step of transmitting said data including said air pressure, said sensor ID and said specific number from said sensor unit to said receiver;
   a step of, in said receiver, making a decision as to whether or not said control unit number transmitted from said control unit agrees with said specific number included in said data transmitted from said sensor unit; and
   a step of, when said control unit number agrees with said specific number, registering said sensor ID included in the transmitted data.

6. The method according to claim 5, wherein, in the sensor ID registering step, when said control unit number agrees with said specific number, said sensor ID is temporarily registered, and when the number of temporarily registered sensor IDs agrees with the number of sensors built in said tires of said vehicle, said sensor ID is formally registered.

7. The method according to claim 5, wherein said data has a pressure data area in which a value of said air pressure in the interior of said tire is set, and said data is transmitted in a state where said specific number is set in said pressure data area.

8. The method according to claim 7, wherein said control unit number is set at a value lower than the atmospheric pressure.

* * * * *